United States Patent [19]

Warmbold

[11] 4,212,318
[45] Jul. 15, 1980

[54] RETAINER ASSEMBLY FOR FUEL TANK MOUNTED SENDING UNIT

[75] Inventor: Helmut Warmbold, Sterling Heights, Mich.

[73] Assignee: Chrysler Corporation, Highland Park, Mich.

[21] Appl. No.: 68,837

[22] Filed: Aug. 22, 1979

[51] Int. Cl.² ........................ E03B 11/00; F17D 1/00
[52] U.S. Cl. ................................ 137/590; 220/86 R; 220/288; 220/319
[58] Field of Search ............. 137/590; 220/86 R, 288, 220/319

[56] References Cited

U.S. PATENT DOCUMENTS

| | | | |
|---|---|---|---|
| 3,173,469 | 3/1965 | Shockey | 137/590 |
| 3,470,907 | 10/1969 | Shockey | 137/590 |

*Primary Examiner*—George T. Hall
*Attorney, Agent, or Firm*—Baldwin & Newtson

[57] ABSTRACT

A retainer assembly for sealingly securing a fuel level sending unit or other fuel tank wall mounted device to a portion of the fuel tank wall is provided which includes a retaining member which threadedly engages the tank wall in a ratcheting manner and compressively engages a seal carried between the unit and the tank.

7 Claims, 3 Drawing Figures

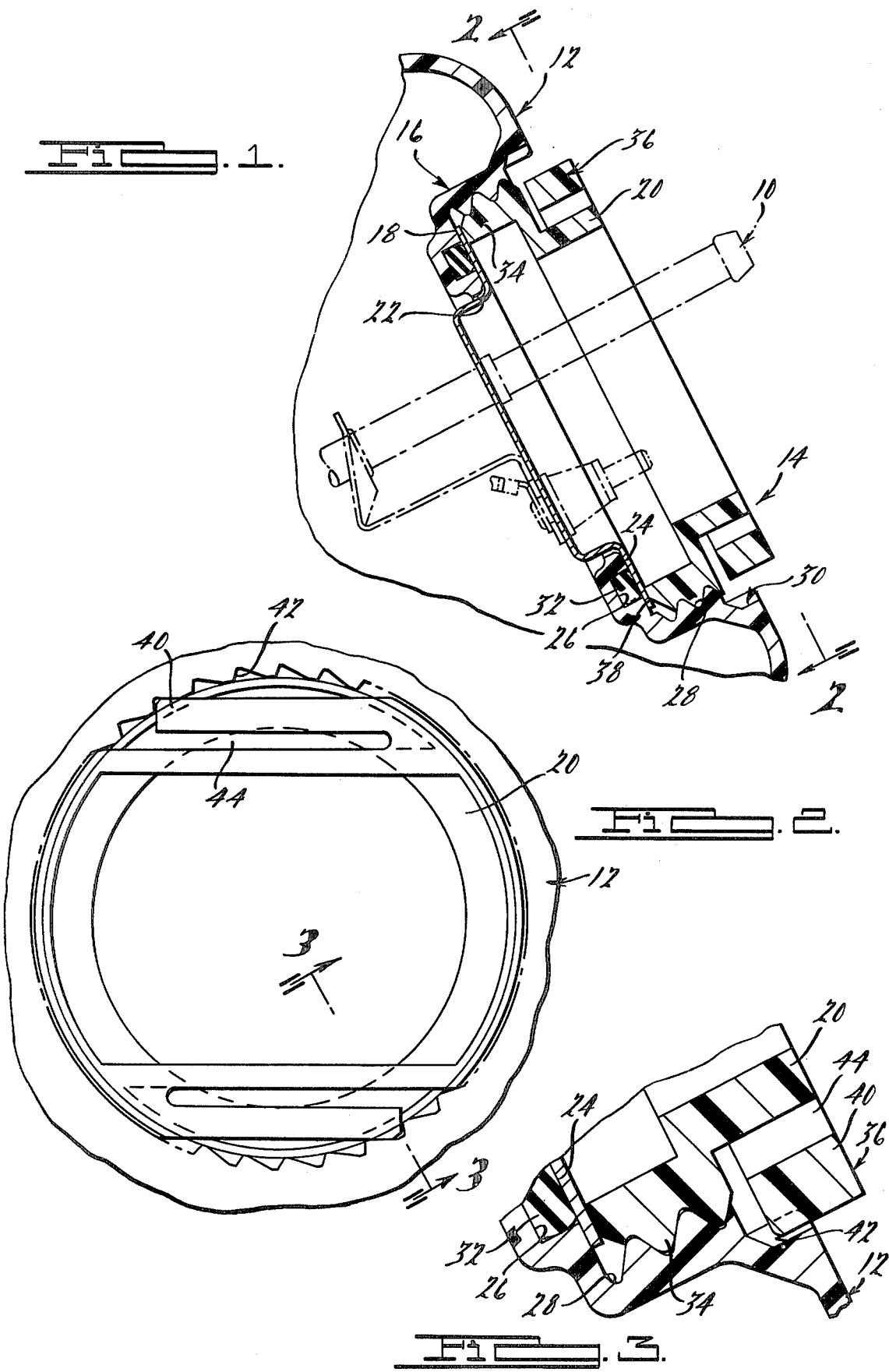

4,212,318

RETAINER ASSEMBLY FOR FUEL TANK MOUNTED SENDING UNIT

SUMMARY OF THE INVENTION

Responsive to the deficiencies of the prior art, it is an object of the present invention to provide an effective means of sealingly retaining a component within an aperture formed through a wall of an automotive plastic fuel tank.

It is another object to provide such retaining means which is resistant to vibration.

It is yet another object to provide such retaining means which is simple and economical to produce.

According to a feature of the present invention retaining means are provided in which sealing means are operatively engaged by a retaining member threadedly engaging the fuel tank.

According to another feature, ratchet means are provided to prevent loosening of threaded engagement.

According to yet another feature, retaining means are provided which comprise a minimal number of economically producible parts.

BACKGROUND OF THE INVENTION

1. Field of Invention

The present invention relates generally to fluid impervious closures and more specifically to a retaining closure for use in mounting a component communicating through a wall of an automobile fuel tank.

2. Description of the Prior Art

Since the automotive industry has begun to make use of plastic fuel tanks, attempts have been made to devise a satisfactory method of mounting in fluid-tight relationship fuel level sending units and other components which must communicate through a wall of the fuel tank. One such attempt involves forming threads in the tank wall and threadedly engaging the sending unit or an associated retaining member. Tanks so constructed are undesirable in that upon subjecting the tank to vibration, the threadedly engaged sending unit tends to loosen. In another prior art tank, an annular metallic member is molded in place about the opening through the tank wall and conventional metallic fastening means are employed to retain the sending unit to the annular member. Such tanks have been found uneconomical to produce.

BRIEF DESCRIPTION OF THE DRAWINGS

These and other objects and features will become apparent to those skilled in the fuel tank art upon reading the following detailed description of a preferred embodiment with reference to the accompanying drawing in which:

FIG. 1 is a cross-sectional view of the retaining means of the present invention installed to retain a fuel level sending unit in a plastic fuel tank of an automobile, certain parts removed for clarity;

FIG. 2 is a top view of the retaining means of the present invention taken in the direction of arrows 2—2 of FIG. 1; and FIG. 3 is an enlarged cross-sectional view of a portion of the retaining means of the present invention taken along line 3—3 of FIG. 2.

DESCRIPTION OF THE PREFERRED EMBODIMENT

Referring now to FIG. 1, portions of a fuel level sending unit 10 of essentially known design is illustrated as being installed for communication between the interior and exterior of an automobile fuel tank 12. The sending unit 10 and the fuel tank 12 are specially configured to form part of the retainer assembly of the present invention indicated generally at 14.

The invention retainer assembly 14 consists essentially of an inwardly extending mounting bore 16 of the fuel tank 12, a sealing flange portion 18 of the sending unit 10, and a retaining plug member 20.

The fuel tank 12 is preferably formed as a molded plastic part having provision made therein for forming the mounting bore 16. The mounting bore 16 is formed in a stepped configuration including a through aperture 22, a sealing shoulder 24 extending radially outwardly from the aperture 22 and having an annular groove 26 formed in it, a threaded portion 28 extending outwardly from the shoulder 24, and a toothed ratchet portion 30, which may best be seen in FIG. 2.

The sending unit sealing flange 18 is formed on the sending unit 10 as a flat annular structure abuttingly engageable with the shoulder 24 and compressively engageable with an elastomeric sealing member 32 carried in the groove 26.

The retaining plug member 20 is preferably formed as a ring-like molded plastic part received in the mounting bore 16 and includes an inner threaded portion 34 and an outer pawl portion 36. The inner threaded portion 34 terminates in an inner end 38 which abuts sending unit sealing flange 18 upon threaded insertion within mounting bore threaded portion 28 to urge the sealing flange 18 compressively against the shoulder 24 and the seal member 32. Fluid-tight engagement of the sending unit about the aperture 22 is thus effected. As this threaded insertion is completed, it can be seen in FIGS. 2 and 3 that pawls 40 of plug member pawl portion 36 slip in a ratcheting manner over the teeth 42 of mounting boss ratchet portion 30 as tightening rotation (clockwise in FIG. 2) is accomplished. It is clear from the illustration of FIGS. 2 and 3 that inadvertent loosening rotation of the plug member as might be caused by vibration is resisted by the cooperation of the pawls 40 and teeth 42. Loosening rotation for disassembly, however, is permitted by provision of chordally extending slots 44 formed in defining the pawls 40. Since formation of the plug member 20 as a plastic molded part permits the choice of thickness of the pawls 40 and the slots 44 to provide a high degree of flexibility, the pawls 40 may be compressed radially inwardly out of engagement with the teeth 42 to allow rotative loosening of the plug member 20.

While only one embodiment of the invention retaining assembly has been described, others may be possible without departing from the scope of the appended claims. For example, the fuel tank may be externally threaded and the plug member modified to conform or the pawl portion of the plug member could be formed as a separate part.

What is claimed is:

1. In an automotive fuel tank having an aperture formed through a wall thereof for permitting insertion of a component having portions communicating with the interior and the exterior of the tank, a retainer assembly for securing said component to said wall of said tank in sealing relationship about said aperture, said retaining means comprising:

A. a stepped retainer bore formed in said tank wall about said aperture and having:
  1. an inner annular shoulder portion adjacent said aperture;
  2. an outer toothed ratchet portion formed adjacent the exterior surface of said tank wall; and
  3. an intermediate threaded portion;
B. means defining an annular flange on said component registering with said inner annular shoulder portion;
C. elastomeric sealing means disposed between said annular shoulder portion and said annular flange; and
D. a plug member received in said stepped retainer bore for compressively engaging said component annular flange to effect sealing engagement and having:
  1. an inner threaded portion engaging said bore threaded portion, and
  2. an outer pawl portion operative in one condition to engage said bore ratchet portion to normally permit rotation of said plug member in a direction effecting tightening threaded engagement with said fuel tank wall.

2. A retainer assembly as defined in claim 1 wherein said pawl portion is operative in another condition to permit rotation of said plug member in another direction effecting loosening of threaded engagement with said fuel tank wall.

3. A retainer assembly as defined in claim 2 wherein said plug member comprises a substantially cylindrical member formed of a readily flexible material and said pawl portion comprises elongated pawl means extending chordally within said plug member and cantileverly secured thereto to engage said fuel tank ratchet portion in said one condition and radially inwardly compressible to effect disengagement from said fuel tank ratchet portion in said other condition.

4. A retainer assembly as defined in claim 3 wherein said pawl portion is integrally formed with said plug member.

5. A retainer assembly as defined in claim 2 wherein said plug member comprises a substantially cylindrical member formed of a readily flexible material and having an end having a pair of chordally extending slots formed therethrough and wherein said pawl portion comprises a pair of chordally extending pawls engageable with said tank toothed ratchet portion in said one condition and radially inwardly compressible into said slots to effect disengagement from said tank toothed ratchet portion in said other condition.

6. A retainer assembly as defined in claim 1 and further comprising means defining an annular groove in said fuel tank shoulder portion for receiving said elastomeric sealing means.

7. In a molded plastic automotive fuel tank having an aperture formed through a wall thereof for permitting insertion of a component having portions communicating with the interior and the exterior of the tank, a retainer assembly for securing said component to said wall of said tank in sealing relationship about said aperture, said retaining means comprising:

A. a retainer member having a threaded portion and a pawl portion axially spaced therefrom;
B. means disposed in said fuel tank wall for receiving said retainer member including a threaded portion engageable with said retainer member threaded portion and a ratchet portion engageable with said retainer member pawl portion to permit rotation in only a tightening direction;
C. means defining an annular shoulder adjacent said fuel tank wall threaded portion;
D. means defining an annular flange on said component disposed intermediate said retainer member and said annular shoulder;
E. elastomeric sealing means disposed intermediate said annular flange and said annular shoulder and compressively engaged upon tightening rotation of said retainer member to a sealing position; and
F. means for permitting selective displacement of said pawl portion to a position effecting disengagement from said ratchet portion to permit loosening rotation of said retainer member away from said sealing position.

* * * * *